United States Patent [19]

Sou

[11] Patent Number: 4,752,835

[45] Date of Patent: Jun. 21, 1988

[54] AUDIO SIGNAL GENERATING APPARATUS FOR GENERATING AN AUDIO SIGNAL TO BE RECORDED ON A VIDEO DISC

[75] Inventor: Terunobu Sou, Sagamihara, Japan

[73] Assignee: Victor Company of Japan, Ltd., Yokohama, Japan

[21] Appl. No.: 874,175

[22] PCT Filed: Oct. 1, 1985

[86] PCT No.: PCT/JP85/00543

§ 371 Date: May 30, 1986

§ 102(e) Date: May 30, 1986

[87] PCT Pub. No.: WO86/02223

PCT Pub. Date: Apr. 10, 1986

[30] Foreign Application Priority Data

Oct. 2, 1984 [JP] Japan .................. 59-206510

[51] Int. Cl.[4] .......................... H04N 5/76
[52] U.S. Cl. ...................... 358/342; 358/343; 358/346
[58] Field of Search .......... 358/312, 313, 342, 343, 358/907, 346; 360/10.1, 19.1

[56] References Cited

U.S. PATENT DOCUMENTS

| | | | |
|---|---|---|---|
| 4,065,795 | 12/1977 | Shutterly | 360/19.1 |
| 4,142,209 | 2/1979 | Hedlund et al. | 358/342 |
| 4,227,213 | 10/1980 | Isobe | 358/343 |
| 4,353,090 | 10/1982 | Broadbent | 358/342 |
| 4,402,018 | 8/1983 | Wada et al. | 358/342 |
| 4,463,389 | 7/1984 | Golding | 358/343 |
| 4,490,752 | 12/1984 | Machida et al. | 358/342 |
| 4,510,531 | 4/1985 | Sugiyama | 358/342 |
| 4,611,248 | 9/1986 | Honjo et al. | 358/342 |

FOREIGN PATENT DOCUMENTS 025277 3/1981 European Pat. Off. .
57-164671 10/1982 Japan .
58-12486 1/1983 Japan .

Primary Examiner—Donald McElheny, Jr.
Attorney, Agent, or Firm—Michael N. Meller

[57] ABSTRACT

An audio signal generating apparatus generates an audio signal which is to be recorded on a video disc so that the audio signal is normally reproduceable in a normal reproduction mode, where the video disc is recorded with a first composite video signal or a second composite video signal so that the first composite video signal related to the same field or the second composite video signal related to the same picture frame of a movie film is repeatedly recorded for a plurality of fields in each track turn and a picture is obtained from the video disc in the normal reproduction mode as a pickup reproducing element scans along a scanning locus including a forced track shift. The audio signal generating apparatus produces a time base expanded audio signal which is expanded of the time base by M (M is a rational number greater than one) by reproducing a pre-recorded audio signal from a first recording medium which is pre-recorded with an audio signal separated from a television signal at a speed which is slower than a speed at the time of recording the first recording medium, and compresses the time base of the time base expanded audio signal by 1/M based on clock signals which are in phase synchronism with a periodic signal in the first or second composite video signal so as to produce a time base compressed audio signal having portions of information repeated. This time base compressed audio signal is recorded on a second recording medium together with the first or second composite video signal related to the same field or the same picture frame for every aforementioned plurality of fields.

5 Claims, 9 Drawing Sheets

AUDIO SIGNAL GENERATING APPARATUS FOR GENERATING AN AUDIO SIGNAL TO BE RECORDED ON A VIDEO DISC

TECHNICAL FIELD

The present invention relates to an audio signal generating apparatus for generating in synchronism with a composite video signal an audio signal which is to be recorded, when producing a video disc, that is, a rotary recording medium recorded with a television signal comprising a composite video signal and an audio signal.

BACKGROUND ART

A video disc which is recorded with a television signal comprising a composite video signal and an audio signal is recorded with a plurality of fields of the television signal in one track turn (description will hereinafter be given for a case where four fields are recorded), in order to realize a large recording capacity under limitations such as practical diameter and rotational speed of the disc and a relative linear velocity between a pickup and the disc for obtaining a satisfactory signal-to-noise ratio. When playing this video disc in a still picture reproduction mode, the same track turn is scanned repeatedly. For this reason, in the still picture reproduction mode, the audio signal in the reproduced television signal is generally muted and the sound is not generated, while information in the four fields of the composite video signal are reproduced repeatedly. However, in the case where the picture content of the video signal which is to be reproduced relates to a moving picture, the pictures of the four fields recorded in one track turn are mutually different, and the picture reproduced in the still picture reproduction mode will not appear still but will appear as if it is undergoing a reciprocating movement. Hence, the reciprocating movement in the picture reproduced in the still picture reproduction mode becomes large as the movement in the moving picture becomes fast, and there is a disadvantage in that the picture reproduced in the still picture reproduction mode does not appear still and is awkward.

On the other hand, it is possible to consider recording a video information content of the same field repeatedly for four fields in one track turn and obtain a still picture by repeatedly scanning this one track turn. In this case, only the video information content of the same field is reproduced repeatedly even when the same track turn is scanned repeatedly, and it is possible to obtain a perfectly still picture.

However, when the video information of a first field is recorded repeatedly for four fields in a first track turn, the video information of a fifth field is recorded repeatedly for four fields in a second track turn and the video information of the same field is thereafter recorded repeatedly in each track turn for every four fields, it is possible to obtain a perfectly still picture in the still picture reproduction mode but a movement in the reproduced picture is awkward in a normal reproduction mode because ¾ of the video information is missing.

On the other hand, when the video information of a first field is recorded repeatedly for four fields in a first track turn, the video information of a second field is recorded repeatedly for four fields in a second track turn and the video information of each field is thereafter recorded repeatedly in each track turn, it is possible to obtain a perfectly still picture in the still picture reproduction mode but there is a disadvantage in that a slow motion picture is reproduced in the normal reproduction mode because the video information of each field is reproduced four times. Furthermore, there is a disadvantage in that the audio signal cannot be reproduced normally from the disc which is recorded with the video information so that the perfectly still picture can be obtained in the still picture reproduction mode.

Accordingly, a disc was proposed in a U.S. Pat. No. 4,490,752, a British patent No. 2,099,202 and a West German patent No. 3212134.2-09 in which the assignee or applicant is the same as the applicant of the present application. According to the proposed disc, a video signal of the same unit is recorded repeatedly for a plurality of fields in each track turn, and divided audio signal portions which are obtained by dividing the audio signal for every field of the video signal which is reproduced are recorded sequentially on the track of the video signal according to a scanning locus of a pickup reproducing element which undergoes at least one forced track shift in two revolutions of the disc in the normal reproduction mode. In the still picture reproduction mode, it is possible to obtain a perfectly still picture by reproducing repeatedly the video signal of the same unit in the same track turn, and in the normal reproduction mode, it is possible to satisfactorily obtain a normally reproduced picture and a normally reproduced audio signal by causing the forced track shift of the pickup reproducing element at predetermined positions on the disc.

Because the divided audio signal portions are sequentially recorded according to the scanning locus of the pickup reproducing element at the time of the normal reproduction mode, there are track turns having a discontinuous point (edit point) where the information content of the audio signal becomes discontinuous. In addition, when recording the video disc, the television signal is successively recorded on the track turns from the outer periphery to the inner periphery of the disc (or vice versa), and the recording is continuously carried out at a constant speed without interruption due to the construction of a cutting machine. Accordingly, when recording the video disc, the audio signal must be generated in a pre-edited state with a sequence with which the audio signal is to be recorded and in synchronism with the composite video signal. The scanning locus of the pickup reproducing element in the normal reproduction mode is different for the cases where (1) the source of the composite video signal is a movie film having 30 picture frames per second, (2) the source of the composite video signal is video tape recorder (VTR) for playing a pre-recorded magnetic tape or a television camera and generates a video signal having 30 frames per second, and (3) the source of the composite video signal is a movie film having 24 picture frames per second. For this reason, the unit with which the audio signal is to be divided and the sequence of the divided audio signal portions must be selected depending on the source of the composite video signal.

DISCLOSURE OF THE INVENTION

The present invention time base compresses an audio signal which has been time base expanded by M (where M is a rational number greater than one) by 1/M by use of a digital memory and repeatedly reads out a digital audio signal in a real time base a desired number of times, passes the digital audio signal through a digital-to-analog converter and records an output audio signal thereof on a recording medium such as a magnetic tape together with a composite video signal.

An object of the present invention is to provide an audio signal generating apparatus for generating an audio signal in the real time base by time base compressing an audio signal which has been time base expanded and repeating the time base compressed audio signal a desired number of times. According to the present invention, it is possible to generate the audio signal which is to be recorded in a predetermined sequence according to a scanning locus of a pickup reproducing element at the time of the reproduction so that the audio signal can be reproduced normally, with respect to a video disc which requires a forced track shift of the pickup reproducing element in the normal reproduction mode.

Another object of the present invention is to provide an audio signal generating apparatus comprising means for operating time base compressed audio signal generating means and time base compressing means in synchronism with a composite video signal reproducing apparatus. According to the present invention, it is possible to generate an audio signal which accompanies a composite video signal in synchronism with the composite video signal, and so that the audio signal is generated repeatedly in units of a predetermined time period for a predetermined number of times.

A further object of the present invention is to provide an audio signal generating apparatus in which a time base expansion rate of time base compressed audio signal generating means and a time base compression rate of time base compressing means are respectively switched depending on a kind of source of a composite video signal. According to the present invention, even when a scanning locus of a pickup reproducing element at the time of the normal reproduction mode is different depending on the kind of the source of the composite video signal, it is possible to correspondingly switch the sequence to an optimum sequence so that the audio signal is always reproduced normally.

Other objects and further features of the present invention will be apparent from the following detailed description when read in conjunction with the accompanying drawings.

BEST MODE OF CARRYING OUT THE INVENTION

An audio signal generated in the present invention, is a signal which is recorded on a video disc in synchronism with a composite video signal. The composite video signal is recorded on the video disc as previously proposed in the patents referred to before by recording video information on track turns so that the video information is the same in one track turn and a perfectly still picture is obtainable in a still picture reproduction mode, and a scanning locus of a pickup reproducing element at the time of a normal reproduction mode is different depending on a source of a composite video signal. Hence, a method of generating the audio signal is also different depending on the kind of the source of the composite video signal. First, brief description will be given with respect to the kinds of the sources of the composite video signal, the signal recording sequence of the video disc for each of the sources of the composite video signal, the scanning locus of the reproducing element at the time of the normal reproduction mode and the like (if necessary, refer to the details in the description of the U.S. Pat. No. 4,490,752 described before).

Figure 8:
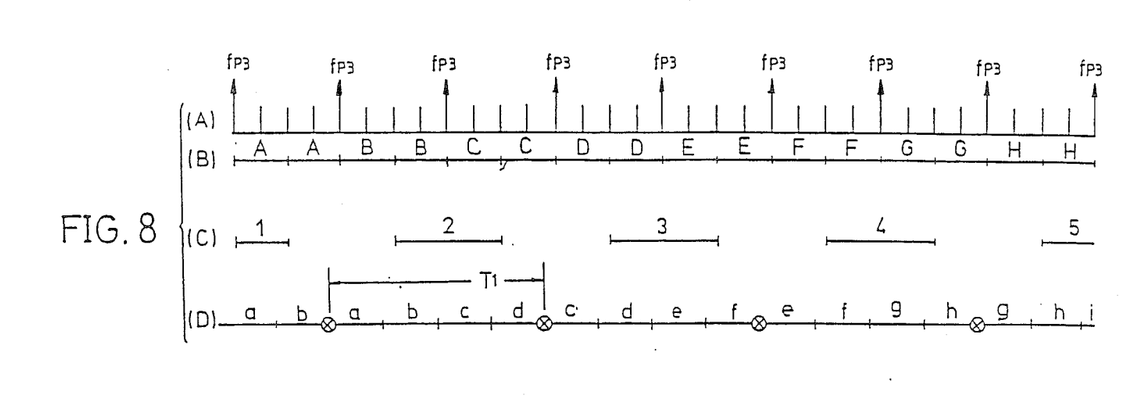
FIG. 8 is a diagram for explaining a signal recording sequence and a reproducing sequence of a video disc recorded with the composite video signal of the movie film having 30 picture frames per second and the audio signal.
Figure 10:
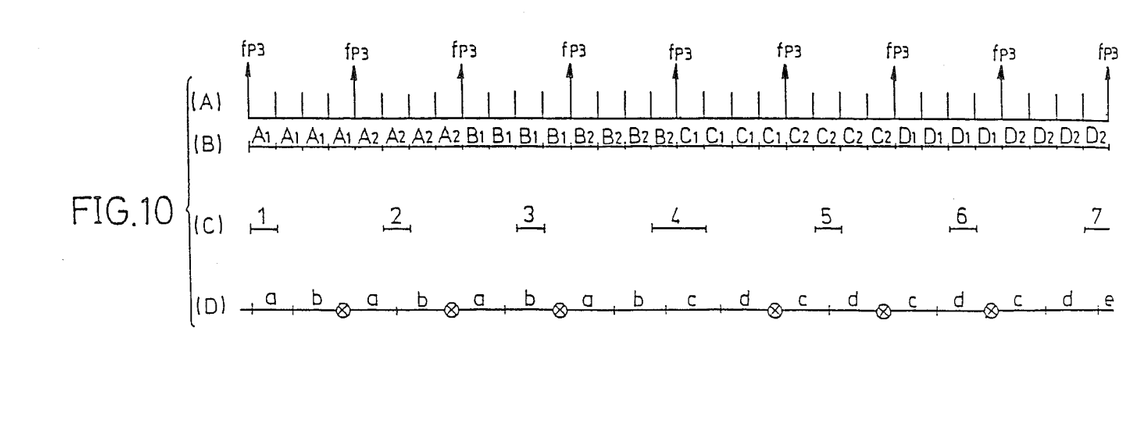
FIG. 10 is a diagram for explaining a signal recording sequence and a reproducing sequence of a video disc recorded with the composite video signal having 30 frames per second and the audio signal.

FIG. 8 is a diagram for explaining a signal recording sequence of the video disc recorded with the composite video signal for the case where the source of the composite video signal is the movie film having 30 picture frames per second, and this video disc is recorded with the signal at the rate of four fields per track turn. FIG. 8(A) (and FIG. 10(A)) schematically shows recording positions of a vertical synchronizing signal for every one field. In FIG. 8(A) (and FIG. 10(A)), a signal fp3 for indicating a reference phase of one track turn on the disc is recorded together with the vertical synchronizing signal at positions indicated by arrows.

Figure 9:
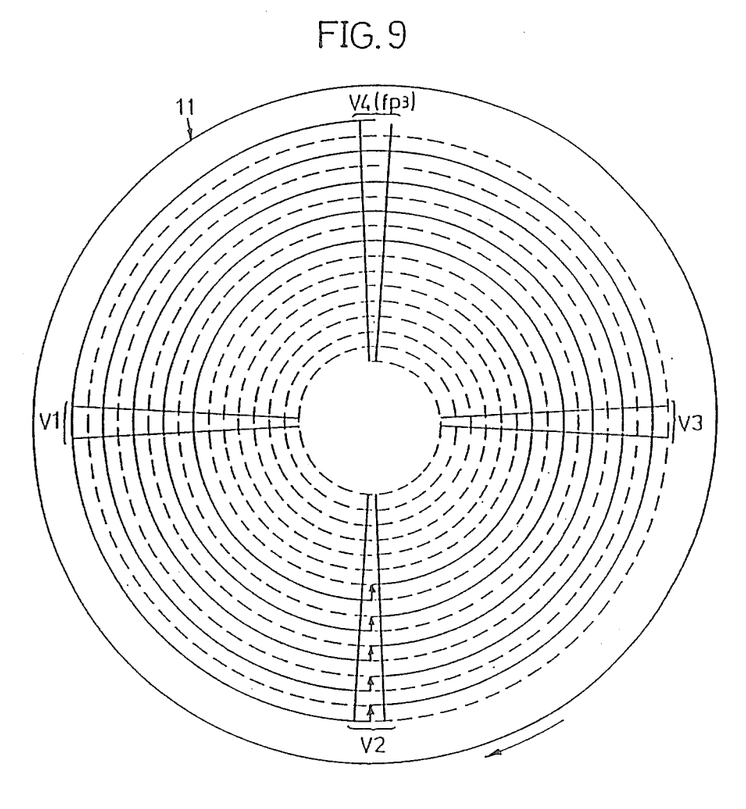
FIG. 9 shows a scanning locus of a reproducing element on the video disc shown in FIG. 8 in a normal reproduction mode.

In FIG. 8(B), each alphabet indicates one picture frame of the movie film having 30 picture frames per second, and a sequence of the alphabets indicates the sequence of the picture frames. Hence, as shown in FIG. 8(B), the composite video signal of the same picture frame is recorded repeatedly for a total of four times in one track turn starting from the recording position of the signal fp3 (one picture frame of the composite video signal is recorded for ½ the revolution period of the disc). The composite video signal of each picture frame of the movie film having 30 picture frames per second is successively recorded on the track turns from the outer periphery to the inner periphery of the disc without omitting the picture information. Accordingly, in the normal reproduction mode, the video disc is scanned in the sequence A→B→C→D→. . . shown in FIG. 8(C) so that the pre-recorded composite video signal is normally reproduced in the sequence of the picture frames of the original movie film as a composite video signal having a field frequency of 60 Hz. The scanning locus of the pickup reproducing element in this normal reproduction mode is indicated by a solid line in FIG. 9 wherein a forced track shift of one track pitch in the inner periphery takes place in a recording part V2 out of recording parts V1 through V4 of the vertical blanking period on a video disc 11, and this scanning locus is identical to that of a conventional video disc played in a two-times speed quick motion reproduction mode. Hence, it is necessary to record the audio signal as shown in FIG. 8(D) according to the scanning locus at the time of the normal reproduction mode so that the audio signal can normally be reproduced in the original sequence.

In FIG. 8(D) (and FIG. 10(D)), the alphabets in small letters indicate the audio signal having a time length of two fields, and the sequence of the alphabets indicates the sequence of the audio signal. As may be seen from FIG. 8(D), the audio signal is recorded twice for every four fields and the audio signal is repeatedly recorded with a period T1 of eight fields. A mark "⊕" indicates a repetition point (edit point) of the audio signal and the audio signal is discontinuous at this edit point, and for this reason, the edit points are located at positions avoiding the kicking positions so that the reproduced audio signal does not become discontinuous even when the kicking positions slightly deviate due to some cause.

Figure 11:
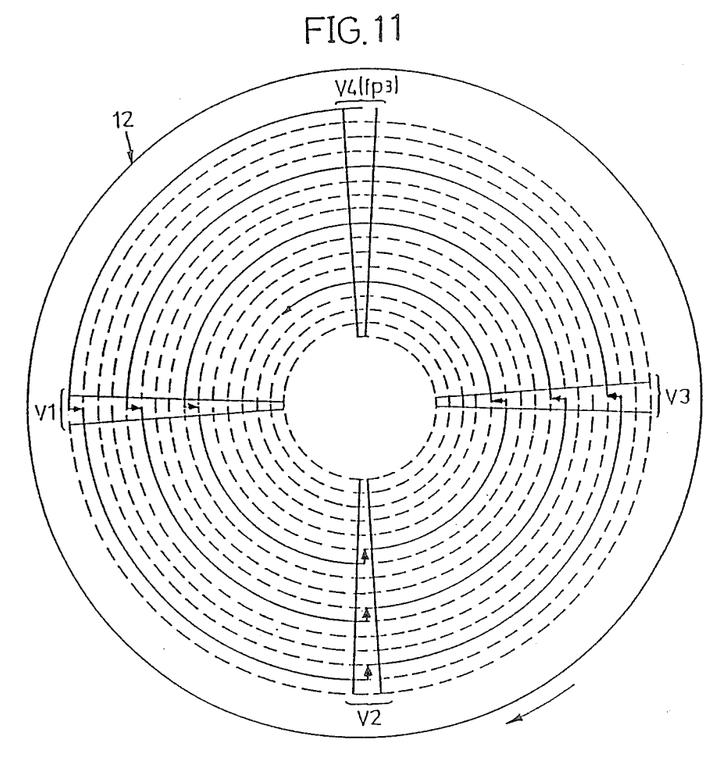
FIG. 11 shows a scanning locus of the reproducing element on the video disc shown in FIG. 10 in the normal reproduction mode.

Next, in the case of the video disc recorded with the composite video signal having 30 frames per second, that is, having a field frequency of 60 Hz, the composite video signal of the same field is recorded repeatedly in one track turn and the composite video signal is successively recorded without omitting information so that four identical fields are recorded in each track turn as shown schematically in FIG. 10(B). For this reason, in order to normally reproduce the composite video signal having the field frequency of 60 Hz from this video disc in the normal reproduction mode, one field is reproduced from each track turn in the sequence shown in FIG. 19(C). As a result, a normally reproduced picture having the original sequence A1→A2→B1→B2→C1→. . . is obtained. The scanning locus of the pickup reproducing element in this normal reproduction mode is indicated by a solid line in FIG. 11 wherein a forced track shift of one track pitch in the inner periphery takes place in the three recording parts V1 through V3 out of the recording parts V1 through V4 of the vertical blanking period on a video disc 12 excluding the recording part V4 in which the signal fp3 is recorded, and this scanning locus is identical to that of the conventional video disc played in a four-times speed quick motion reproduction mode. Thus, as shown schematically in FIG. 10(D), the audio signal must be recorded four times for every four fields.

Figure 12:
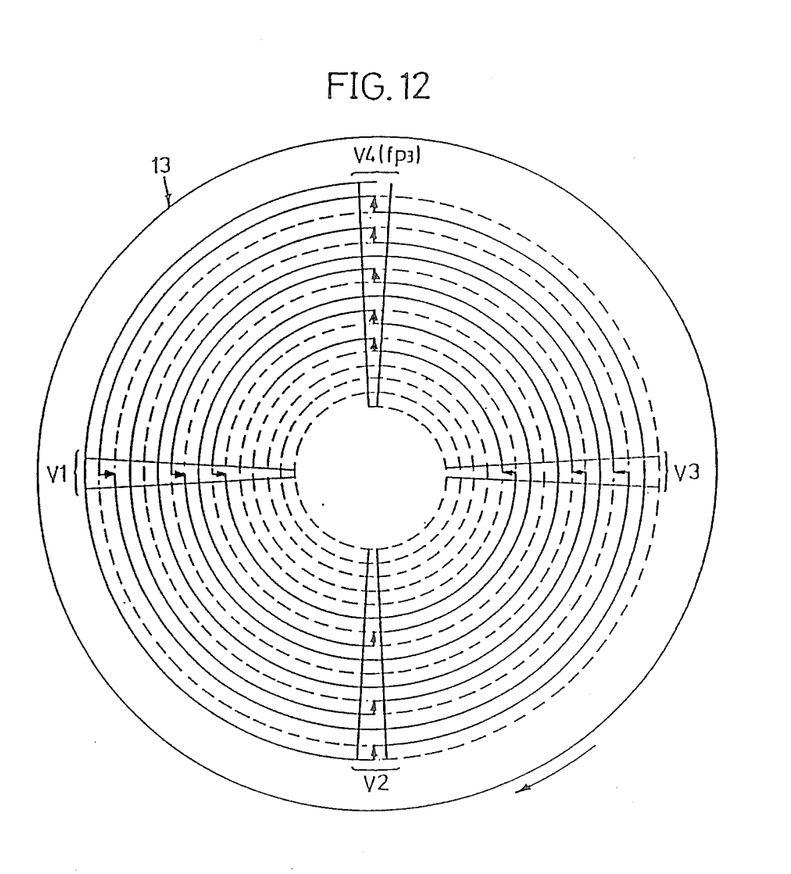
FIG. 12 shows a scanning locus of the reproducing element on a video disc recorded with the composite video signal of the movie film having 24 picture frames per second and the audio signal.

Furthermore, in the case of the video disc recorded with the composite video signal related to the movie film having 24 picture frames per second, the composite video signal of the same picture frame is recorded repeatedly in one track turn and the composite video signal is successively recorded without omitting information. In order to normally reproduce the pre-recorded video signal from this video disc 13 shown in FIG. 12 in the normal reproduction mode as a composite video signal having the field frequency of 60 Hz, the pickup reproducing element must scan over a scanning locus indicated by a solid line in FIG. 12 and reproduce the composite video signal in a sequence A→A→B→B→B→C→C→D→D→ D→E→E→F→F→F→. . . so that the pickup reproducing element repeats an operation of repeatedly reproducing the composite video signal of the one picture frame of the movie film for two fields and repeatedly reproducing the composite video signal of the next picture frame of the movie film for three fields, and it is possible to obtain based on a known 2-3 pull-down system a normally reproduced picture having no time base deviation. The audio signal is recorded in a sequence in accordance with the scanning locus indicated by the solid line in FIG. 12 so that the audio signal can be reproduced normally from the video disc 13 in the normal reproduction mode. The scanning locus of the pickup reproducing element in this normal reproduction mode is identical to that of the conventional video disc played in a 8/5-times speed quick motion reproduction mode, and the pickup reproducing element advances by eight track turns during five revolution periods of the video disc 13.

Next, description will be given with respect to an embodiment of an audio signal generating apparatus for generating the audio signal which is to be recorded in a sequence in accordance with the kind of the video disc, such as the sequences shown in FIGS. 8(D) and 10(D). In an audio signal generating apparatus shown in FIG. 1, a composite video signal which is separated from a television signal which is to be recorded on the video disc is recorded on a first magnetic tape which is to be played on a VTR 15, while on the other hand, an audio signal which is separated from the television signal and is to be normally reproduced is recorded on a second magnetic tape which is to be played on a tape recorder 16. The first and second magnetic tapes are recorded with a time code indicating an absolute address, and the first magnetic tape is recorded with a start video signal for two frames from a point 131 frames (252 fields) before a starting point where the recording of the composite video signal is started to a point 129 frames before the starting point, for example. For example, a 100% white video signal is used as the start video signal. The tape recorder 16 is designed so that a tape moving speed therein can be variably controlled to an arbitrary speed by an internal switch thereof, and as will be described later on in the specification, the tape moving speed is variably controlled depending on the source of the of the composite video signal which is to be reproduced on the VTR 15. As described before, there are three kinds of sources of the video signal, but in each of the sources of the video signal, the composite video signal of the same field or the same picture frame is pre-recorded on the first magnetic tape repeatedly for every four fields. On the other hand, the audio signal is recorded continuously on the second magnetic tape in a normal sequence with which the audio signal is to be reproduced in the normal reproduction mode.

Figure 1:
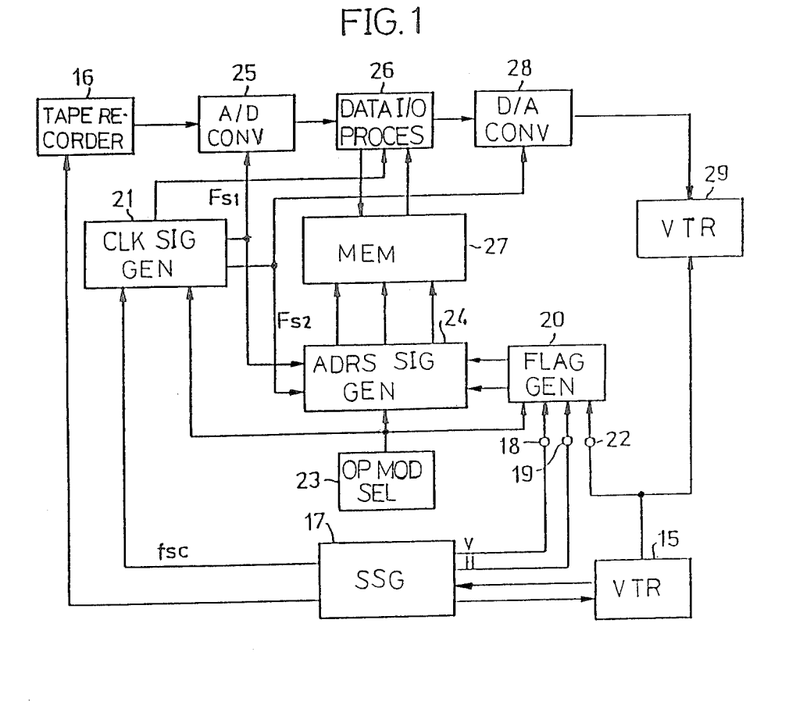
FIG. 1 is a system block diagram showing an embodiment of the audio signal generating apparatus according to the present invention.

A synchronizing signal generator (SSG) 17 synchronizes the operation of the VTR 15. The SSG 17 generates vertical synchronizing pulses and horizontal synchronizing pulses and supplies these pulses to a start flag generating part 20 via terminals 18 and 19, and also generates a periodic signal having a frequency equal to a chrominance subcarrier frequency fsc of the recorded signal and supplies this periodic signal to a clock signal generating part 21. The VTR 15 starts a reproducing operation, supplies the start video signal reproduced from the first magnetic tape to the start flag generating part 20 via a terminal 22, and supplies the time code reproduced from a time code track to the SSG 17. The SSG 17 detects the reproduction of the start video signal based on the reproduced time code, and supplies a start signal to the tape recorder 16 after a predetermined number of frames from the time when the start video signal is reproduced, that is, at a time which is a certain number of frames before the composite video signal is reproduced. A reproducing operation of the tape recorder 16 is started responsive to the start signal.

In the case where the composite video signal reproduced on the VTR 15 is a video signal related to the movie film having 30 picture frames per second, the tape moving speed in the tape recorder 16 is selected to a speed which is ½ that at the time of the normal reproduction mode, and thus, the pre-recorded audio signal on the second magnetic tape is reproduced with the time base thereof expanded. In the case where the composite video signal is a video signal having 30 frames per second, the tape moving speed is selected to a speed which is ¼ that at the time of the normal reproduction mode, and a reproduced audio signal having the time base thereof expanded by four is obtained in this case. Furthermore, in the case where the composite video signal is a video signal related to the movie film having 24 picture frames per second, the tape moving speed is selected to a speed which is ⅝ that at the time of the normal reproduction mode, and a reproduced audio signal having the time base thereof expanded by 8/5 is obtained in this case.

On the other hand, an operation mode selecting part 23 is manipulated by an operator to select the operation mode of the audio signal processing depending on whether the source of the video signal accompanied by the audio signal which is to be processed in the audio signal generating apparatus is (1) a movie film having 30 picture frames per second, (2) a VTR for playing a pre-recorded magnetic tape or a television camera and generates a video signal having 30 frames per second, and (3) a a movie film having 24 picture frames per second. When the operator selects a specific operation mode by the operation mode selecting part 23, an operation mode instruction signal generated from the operation mode selecting part 23 is supplied to the clock signal generating part 21, an address signal generating part 24 and the start flag generating part 20. Hence, the constituent parts described before operate in modes in correspondence with the specific operation mode selected by the operator.

The time base expanded audio signal from the tape recorder 16 is supplied to an analog-to-digital (A/D) converter 25. The A/D converter 25 performs an A/D converting operation based on a first clock signal generated from the clock signal generating part 21. It is evident from the sampling theorem that a repetition frequency Fs1 of the first clock signal supplied to the A/D converter 25 must be higher than two times a maximum frequency of the time base expanded signal which is to be subjected to the A/D conversion. The clock signal generating part 21 also supplies to a digital-to-analog (D/A) converter 28 a second clock signal having a repetition frequency Fs2, and the first and second clock signals from the clock signal generating part 21 are also supplied to the address signal generating part 24.

First digital audio data obtained from the A/D converter 25 and having a quantization number of 16 bits, for example, are passed through a data input/output processing part 26 which is simply an interface circuit and are supplied to a memory device 27. The memory device 27 comprises three digital memories as will be described later, and the first digital audio data are periodically stored in the three digital memories depending on a write-in address signal which has the repetition frequency Fs1 and is obtained from the address signal generating part 24 and the like.

The first digital audio data periodically stored in the three digital memories of the memory device 27 are periodically read out from the three digital memories of the memory device 27 based on a read-out address signal having the repetition frequency Fs2 which is M times the repetition frequency Fs1 of the write-in address signal so that at least a part of the first digital audio data is repeatedly read out as second digital audio data from each digital memory. As a result, the first digital audio data related to the audio signal having the time base thereof expanded by M are repeatedly and successively read out from the memory device 27 as the second digital audio data related to the audio signal having the time base thereof compressed by 1/M and returned to the original real time base.

The second digital audio data read out from the memory device 27 are passed through the data input/output processing part 26 and is supplied to the D/A converter 28 wherein the data are subjected to a D/A conversion based on the second clock signal having the repetition frequency Fs2. Accordingly, the D/A converter 28 supplies to a VTR 29 for producing a master tape a continuous analog audio signal which is repeated on the time base without being compressed nor expanded on the time base.

The VTR 29 records the reproduced composite video signal from the VTR 15 on video tracks on a third magnetic tape, and at the same time, records the analog audio signal from the D/A converter 28 on an audio track on the third magnetic tape. The third magnetic tape is used as the master tape for a recording system of the video disc. The video discs 11, 12 and 13 described before are produced in these manners.

Next, detailed description will be given with respect to various parts of the apparatus according to the present invention. As described before, the memory device 27 performs the write-in operation at the repetition frequency Fs1 and performs the read-out operation at the repetition frequency Fs2 so as to generate the digital audio data in which the time base is compressed by 1/M, and thus, a relation Fs2/Fs1=M stands. When it is assumed that the audio signal has a frequency band of 20 kHz, the time base expanded audio signal having the time base thereof expanded by M has a frequency band of 20/M kHz. In this case, from the sampling theorem, the repetition frequency Fs1 of the first clock signal must be higher than 40/M kHz. In addition, a minimum unit of the time length of the audio signal which is repeated M times is 0.5 field, and a number of data samples per 0.5 field must be a positive integer. By taking the above three conditions into consideration, the repetition frequency Fs1 is selected to 26.937 kHz which is 120/70 times the horizontal scanning frequency and the repetition frequency Fs2 is selected to 43.157 kHz which is 192/70 times the horizontal scanning frequency in the case where the source of the composite video signal is the movie film having 24 picture frames per second, for example, since the value of M described before is 8/5.

Figure 2:
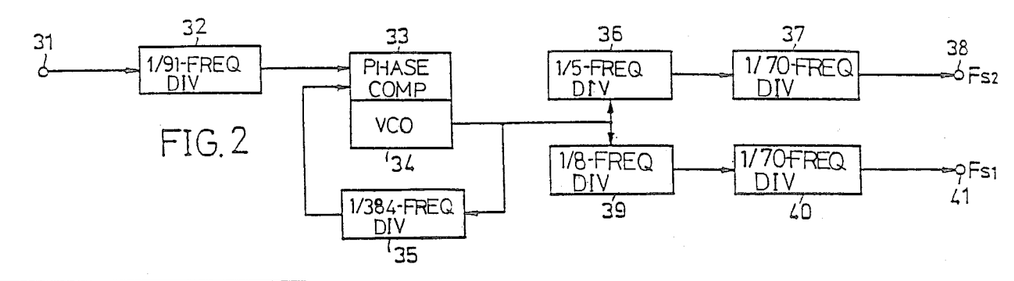
FIG. 2 is a system block diagram showing a clock signal generating part within the block system shown in FIG. 1.

The clock signal generating part 21 has a construction shown in FIG. 2. In FIG. 2, the output periodic signal of the SSG 17 having the chrominance subcarrier frequency fsc is applied to an input terminal 31 and is frequency divided by 1/91 in a 1/91-frequency divider 32. An output signal of the frequency divider 32 is supplied to a known phase locked loop (PLL) comprising a phase comparator 33, a voltage controlled oscillator (VCO) 34 and a 1/384-frequency divider 35. A pulse signal which is in phase synchronism with the input periodic signal and has a repetition frequency of $5 \times 192 \times f_H$ (where $f_H$ denotes the horizontal scanning frequency) is obtained from the VCO 34. This pulse signal is passed through a 1/5-frequency divider 36 and a 1/70-frequency divider 37, and is supplied to an output terminal 38 as the second clock signal having a repetition frequency of $192f_H/70$ (=Fs2). At the same time, the output pulse signal of the VCO 34 is passed through a ⅛-frequency divider 39 and a 1/70 frequency divider 40, and is supplied to an output terminal 41 as the first clock signal having a repetition frequency of $120f_H/70$ (=Fs1).

It is evident that the repetition frequencies Fs1 and Fs2 are also selected so as to satisfy the three conditions described before in the case where the audio signal having the time base thereof expanded by two or four is obtained from the tape recorder 16.

Figure 3:
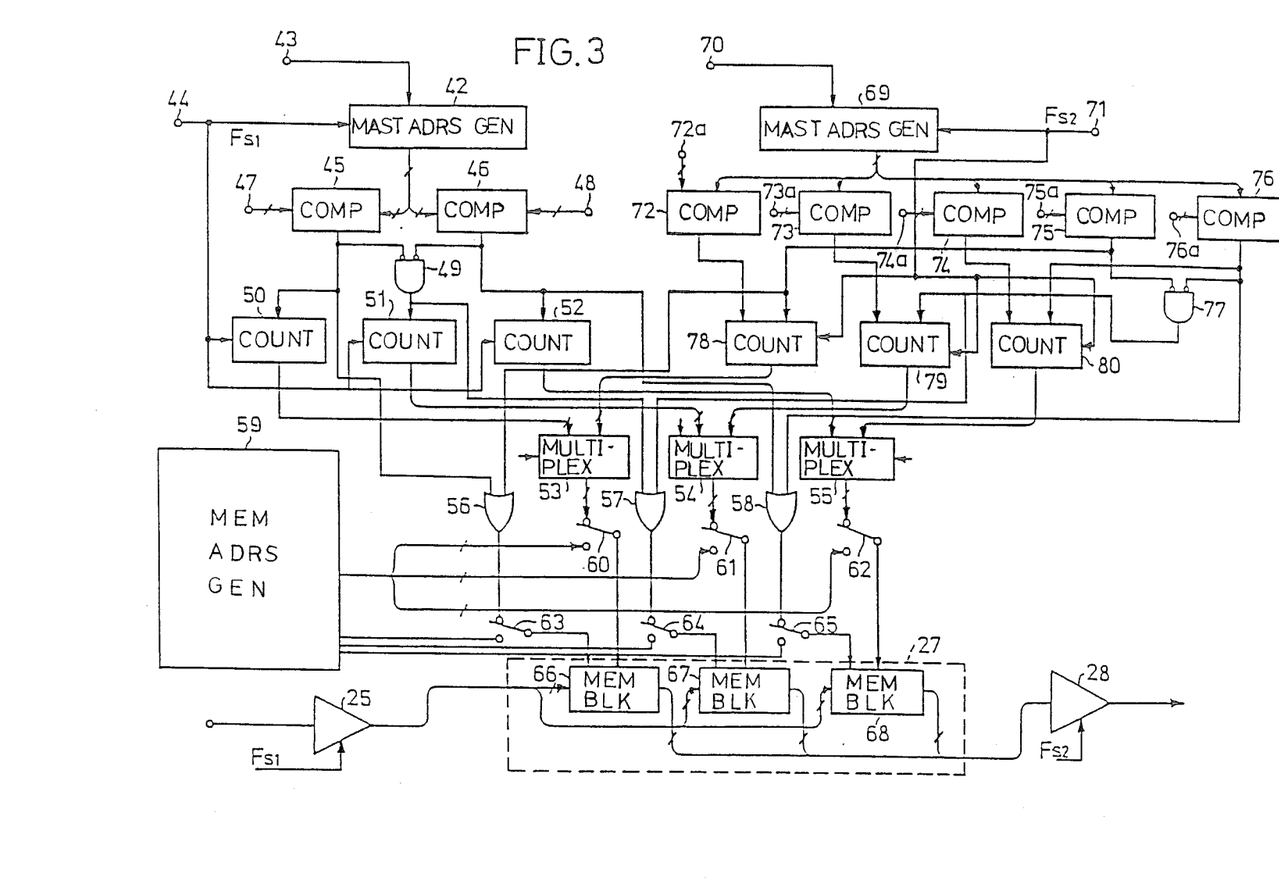
FIG. 3 is a system circuit diagram showing an essential part of the block system shown in FIG. 1.
Figure 4:
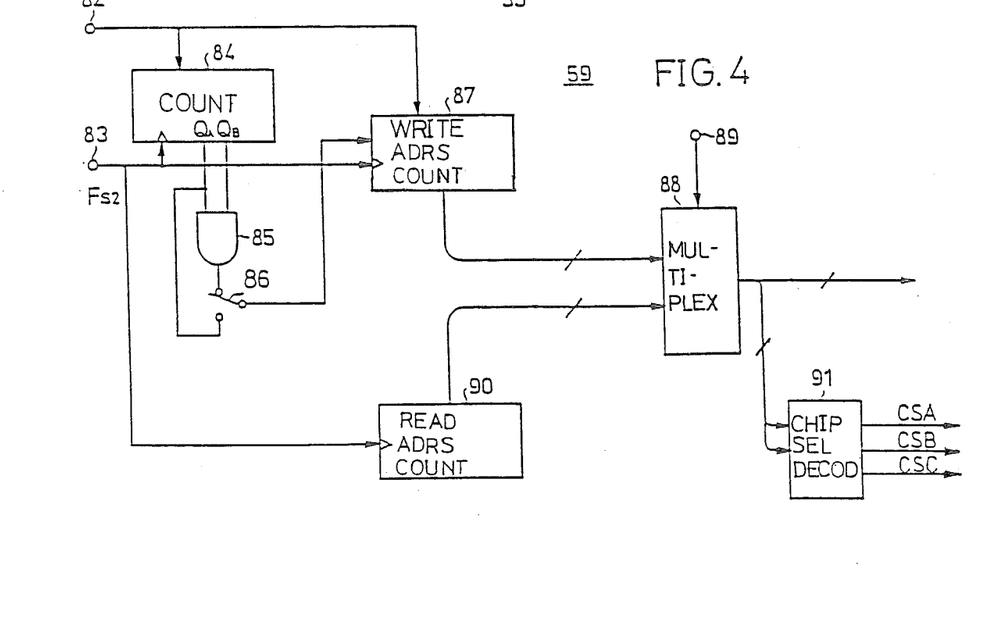
FIG. 4 is a system circuit diagram showing a part of an address signal generating part within the block system shown in FIG. 1.

The constructions of the address signal generating part 24 and the memory device 27 are shown in FIGS. 3 and 4. In FIG. 3, parts excluding the memory device 27, the A/D converter 25 and the D/A converter 28 correspond to the address signal generating part 24. When a write-in start flag from the start flag generating part 20 is supplied via a terminal 43 to an enable terminal of a master address generator 42, the master address generator 42 starts to count the first clock signal Fs1 which is obtained from the clock signal generating part 21 via a terminal 44 from the time when the write-in start flag is supplied thereto. A counted output signal of the master address generator 42 is supplied to memory block detecting comparators 45 and 46. For example, the memory block detecting comparators 45 and 46 generates a high level signal during time periods corresponding to write-in time periods of memory blocks 66 and 68 which will be described later based on set data from terminals 47 and 48. The output signals of the comparators 47 and 48 are supplied to a NOR circuit 49 which generates a high level signal only during a time period in which the two signals supplied thereto have low levels. Accordingly, the NOR circuit 49 generates a signal having a high level during a time period in which both the memory blocks 66 and 68 are not performing a write-in operation, that is, during a time period corresponding to a write-in time period of a memory block 67.

Memory address counters 50, 51 and 52 are respectively supplied with the output signals of the comparator 45, the NOR circuit 49 and the comparator 46, and count the clock signal from the terminal 44 only during a high level period of the signal supplied thereto. A counted output signal of the memory address counter 50 is supplied to a multiplexer 53 as a write-in address signal. Similarly, counted output signals of the memory address counters 51 and 52 are respectively supplied to multiplexers 54 and 55 as write-in address signals. In addition, the output signal of the comparator 45 is passed through an OR circuit 56 and is supplied to a switch 63. The output signal of the NOR circuit 49 is passed through an OR circuit 57 and is supplied to a switch 64, and the output signal of the comparator 46 is passed through an OR circuit 58 and is supplied to a switch 65. The switches 63, 64 and 65 are linked and are switched so as to selectively pass signals CSA, CSB and CSC from a memory address generator 59 or to selectively pass output signals of the OR circuits 56, 57 and 58. Output signals of the switches 63, 64 and 65 are respectively supplied to the memory blocks (digital memories) 66, 67 and 68 as chip select signals, and the memory blocks 66, 67 and 68 are independently operated during high level periods of the chip select signals supplied thereto.

When it is assumed that the audio signal which is generated is to be recorded together with the composite video signal having as its source the movie film having 24 picture frames per second (hereinafter referred to as a 8/5 times speed mode for convenience' sake), the audio signal having the time base thereof expanded by 8/5 is obtained from the tape recorder 16 and is supplied to the memory blocks 66 through 68 via the A/D converter 25. The switches 63 through 65 are switched so as to selectively pass the output signals of the OR circuits 56 through 58. The output signal of the comparator 45 in the 8/5 times speed mode has a high level for ten fields as indicated by $W_A$ in FIGS. 5A(E) and 5B(E), and during the time period WA, the output signal of the memory address counter 50 having the repetition frequency Fs1 is passed through the multiplexer 53 and a switch 60 and is supplied to the memory block 66 as a write-in address signal. Hence, the memory block 66 performs the write-in of the first digital audio data in the time period $W_A$ of ten fields at the repetition frequency Fs1.

Figure 5A:
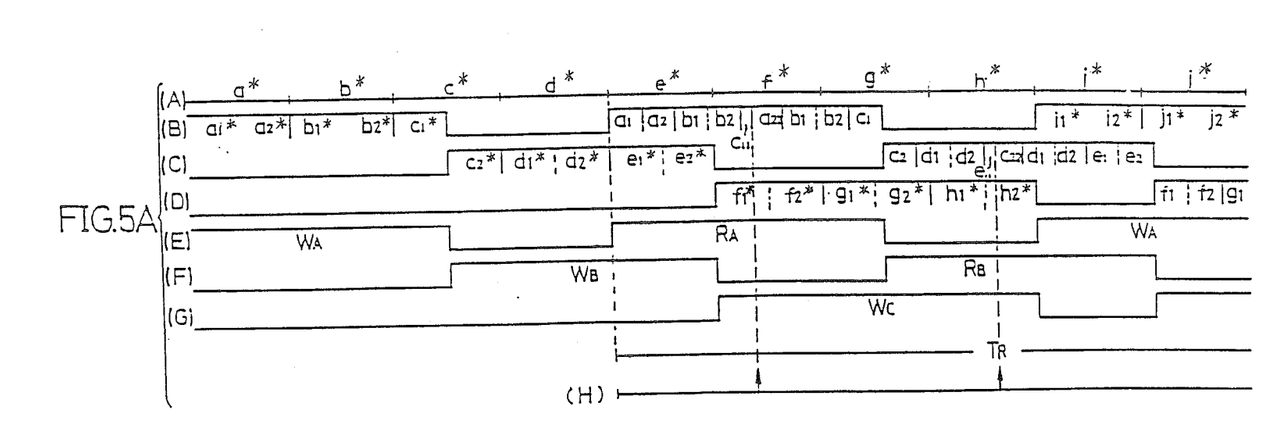
FIGS. 5A and 5B show signal waveforms for explaining the operation of the block system shown in FIG. 1 when a source of a composite video signal is a movie film having 24 picture frames per second.
Figure 5B:
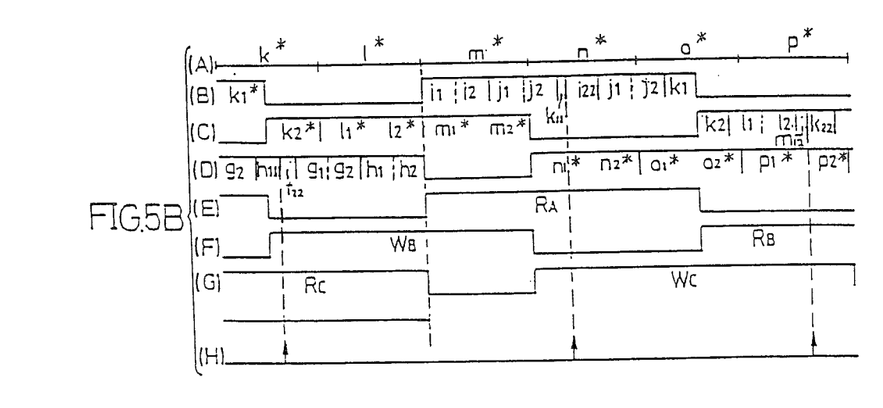

During a time period $W_B$ of ten fields shown in FIGS. 5A(F) and 5B(F) subsequent to the time period $W_A$, the output signal of the NOR circuit 49 has a high level. In addition, during the twelve fields $W_C$ shown in FIGS. 5A(G) and 5B(G) subsequent to the time period $W_B$, the output signal of the comparator 46 has a high level. Furthermore, during the ten fields $W_A$ shown in FIGS. 5A(E) and 5B(E) subsequent to the time period $W_C$, the output signal of the comparator 45 has a high level. In other words, the output signals of the comparator 45, the NOR circuit 49 and the comparator 46 time-divisionally have the high level for every ten fields ten fields and twelve fields, respectively, with a period of 32 fields as indicated by $W_A$, $W_B$ and $W_C$ in FIGS. 5A(E) and 5B(E), 5A(F) and 5B(F) and 5A(G) and 5B(G), and during the high level period of the output signals, the output address signals of the address counters 50, 51 and 52 are respectively passed through the switches 60, 61 and 62 and are supplied to the respective memory blocks 66, 67 and 68 so that the memory blocks 66, 67 and 68 time-divisionally perform the write-in operation for every ten fields. As shown schematically in FIGS. 5A(A) and 5B(A), the audio signal having the time base thereof expanded by 8/5 is successively supplied to the memory blocks 66, 67 and 68, and the memory blocks 66, 67 and 68 periodically write the audio signal therein at the frequency Fs1 for every predetermined number of fields as indicated by $W_A$, $W_B$ and $W_C$ in FIGS. 5A(B) and 5B(B), 5A(C) and 5B(C) and 5A(D) and 5B(D).

In FIGS. 5A(A) through 5A(D) and FIGS. 5B(A) through 5B(D), and FIGS. 6(A) through 6(D) and FIGS. 7(A) through 7(D) which will be described later, the alphabets in small letters indicate the audio information, and the audio information is normally reproduced in the sequence of the alphabets. Furthermore, an asterisk "*" indicates the audio signal having the time base thereof expanded, and the audio signal on the real time base is indicated without the asterisk. FIGS. 5A(A) and 5B(A) show the time base expanded audio signal in units of four fields, and FIGS. 5A(B) through 5B(D) and FIGS. 5B(B) through 5B(D) show the time base expanded audio signal in units of two fields.

On the other hand, in FIG. 3, a master address generator 69 starts to count the second clock signal Fs2 obtained from the clock signal generating part 21 via a terminal 71 from a time when a read-out start flag from the start flag generating part 20 is supplied to an enable terminal of the master address generator 69 via a terminal 70. A counted output signal of the master address generator 69 is supplied to a repetition point detecting comparators 72, 73 and 74 and to memory block detecting comparators 75 and 76. Based on set data supplied to terminals 72a through 74a, the comparators 72, 73 and 74 produce signals when input signals thereof become first predetermined values so as to preset second values in respective address counters 78, 79 and 80. In addition, based on set data supplied to terminals 75a and 76a, the comparators 75 and 76 produce high level output signals when the counted value in the address generator 69 is within a predetermined range. The output signal of the comparator 75 is supplied to the address counter 78 on one hand. On the other hand, the output signal of the comparator 75 is passed through the OR circuit 56 and the switch 63 and is supplied to the memory block 66 as a chip select signal, so that the address counter 78 counts the clock signal having the repetition frequency Fs2 during the high level period of the chip select signal and the memory block 66 performs the read-out operation. Similarly, the output signal of the comparator 76 causes the counting operation of the address counter 80 during the high level period thereof, and this output signal of the comparator 76 is supplied to the memory block 68 as a chip select signal so that the memory block 68 performs the read-out operation during the high level period thereof. In addition, the output signals of the comparators 75 and 76 are passed through a NOR circuit 77 and an output signal of the NOR circuit 77 is supplied to the address counter 79. The output signal of the NOR circuit 77 is passed through the OR circuit 57 and the switch 64 and is supplied to the memory block 67 as a chip select signal. Therefore, the memory block 67 performs the read-out operation during the time period in which both the memory blocks 66 and 68 do not perform the read out operation.

The output signal of the comparator 75 has a high level for 10.25 fields as indicated by $R_A$ in FIGS. 5A(E) and 5B(E). During the next 10.25 fields, the output signal of the NOR circuit 77 has a high level as indicated by $R_B$ in FIGS. 5A(F) and 5B(F), and furthermore, during the next 11.5 fields, the output signal of the comparator 76 has a high level as indicated by $R_C$ in FIGS. 5A(G) and 5B(G). Similarly thereafter, the levels of the output signals of the comparator 75, the NOR circuit 77 and the comparator 76 become high time-divisionally. For this reason, the memory blocks 66 through 68 successively perform the read-out operation time-divisionally. A period $T_R$ of the read-out operations of the three memory blocks 66 through 68 is 32 fields. Since the read-out time period $R_A$ occurs six fields after the write-in time period $W_A$, the read-out time period $R_B$ occurs 6.25 fields after the write-in time period $W_B$ and the read-out time period $R_C$ occurs 4.5 fields after the write-in time period $W_C$.

Accordingly, as shown in FIGS. 5A(B) and 5B(B), the memory block 66 writes therein first digital audio data a1* through c1* of the time base expanded audio signal received during the first write-in time period $W_A$ of ten fields at the repetition frequency Fs1, and six fields thereafter, performs a read-out therefrom for the read-out time period $R_A$ of 10.25 fields at the repetition frequency Fs2 which is 8/5 times the repetition frequency Fs1. As a result, second digital audio data of the audio information having the time base thereof compressed by $\frac{5}{8}$ and returned to the original real time base are read out from the memory block 66. The data written into the memory block 66 are written in the write-in time period $W_A$ of ten fields, and when the data are read out from the memory block 66 so that the data are time base compressed by $\frac{5}{8}$, all of the data are read out once in a time period of 6.25 fields. In this case, the set value of the repetition point detecting comparator 72 coincides with the output counted value of the master address generator 69 after 5.5 fields from the time when the memory block 66 starts the read-out operation. Thus, as shown in FIG. 5A(H), a preset pulse is produced from the repetition point detecting comparator 72 at the time 5.5 fields after the memory block 66 starts the read-out operation, so as to preset the address counter 78 to a predetermined value. Accordingly, the data a1* through b2* in the first half of the eight fields which are written are time base compressed by $\frac{5}{8}$ and read out as data a1 through b2 in five fields, and in a time period of 0.5 field after the data a1 through b2 are read out in the five fields, a data portion c11* corresponding to first 4/5 field of the data c1* is time base compressed and read out as data c11. At a time when the data c11 are read out, the data output are switched over so that data starting from a data portion a22* corresponding to latter 8/5 fields of the data a2* up to the data c1* are time base compressed by $\frac{5}{8}$ and successively read out as data a22, b1, b2 and c1. Hence, the data a1* are read out only once, but the data b1* and b2* are repeatedly read out twice. Moreover, portions of the data a2* and c1* are read out twice.

On the other hand, from the time when the memory block 66 finishes the write-in operation, the memory block 67 writes therein first digital audio data c2* through e2* of the time base expanded audio signal which is received in the next write-in period $W_B$ of ten fields at the repetition frequency Fs1, as shown in FIGS. 5A(C) and 5B(C). As shown in FIGS. 5A(D) and 5B(D), the memory block 67 writes therein first digital audio data f1* through h2* of the time base expanded audio signal received in the next time period of ten fields. The memory block 67 starts to read out therefrom the written data c2* through e2* at the repetition frequency Fs2 from the time when the read-out operation of the memory block 66 is finished so as to compress the time base by ⅝. At a time 4.75 fields after the time when the read-out operation of the memory block 66 is started, the preset pulse is produced from the repetition point detecting comparator 73 as shown in FIG. 5A(H) and presets the address counter 79 to a predetermined value, and the read-out address is switched. Thus, as shown in FIG. 5A(C), the data c2*, d1* and d2* respectively of two fields and a data portion e11* corresponding to first 0.8 fields of data e1* which are written into the memory block 67 in a total of 6.8 fields, are read out as data c2, d1, d2 and e11 in 4.25 fields by compressing the time base by ⅝. Furthermore, after the data c2, d1, d2 and e11 are read out in 4.25 fields, the read-out operation is performed to read out up to the end of the data e2* from a data position 0.4 fields after the start of the data c2* (from the start of the data portion c22* corresponding to latter 1.6 fields of the data c2*). As a result, the data e2* are only read out once from the memory block 67, but the data d1* and d2* are read out twice completely, and portions of the data c2* and e1* are read out twice.

Similarly, data f1* through h2* of twelve fields which are written into the memory block 68 are read out in the read-out time period $R_C$ with the time base compressed by ⅝, as shown in FIGS. 5A(D) and 5B(D). Thereafter, by repeating similar operations, the time base expanded data are time base compressed and read out so that the time base is returned to the original real time base. In the 8/5 times speed mode, the first read out data are obtained 16 fields (8 frames) after the time when one of the memory blocks 66 through 68 starts the write-in operation, as may be seen from FIG. 5A. This means that the reproducing operation of the tape recorder 16 is started 16 fields before the time when the first picture frame of the composite video signal is reproduced from the first magnetic tape on the VTR 15.

Next, when generating the audio signal which is to be recorded together with the composite video signal having as its source the movie film having 30 picture frames per second (hereinafter referred to as a two times speed mode) and when generating the audio signal which is to be recorded together with the composite video signal having the field frequency of 60 Hz (hereinafter referred to as a four times speed mode), the switches 60 through 62 and the switches 63 through 65 shown in FIG. 3 are switched over to selectively pass the output signal of the address generator 59. The address generator 59 has a construction shown in FIG. 4. In FIG. 4, the start flag from the start flag generating part 20 is applied to an input terminal 82 and is supplied to a counter 84 and a write address counter 87 so as to reset these counters. The second clock signal from the clock signal generating part 21 and having the repetition frequency Fs2 is applied to an input terminal 83, and is supplied to the counter 84, the write address counter 87 and a read address counter 90.

The counter 84 counts the second clock signal having the repetition frequency Fs2. The counter 84 produces from a terminal $Q_A$ thereof a first pulse signal which is inverted every time one pulse of the second clock signal is received and has a repetition frequency Fs2/2, and produces from a terminal $Q_B$ thereof a second pulse signal which is inverted every time two pulses of the second clock signal are received and has a repetition frequency Fs2/4. An AND circuit 85 is supplied with the first and second pulse signals, and produces a third pulse signal which has a repetition frequency Fs2/4 and a pulse width equal to that of the first pulse signal. A switch 86 selectively passes the first pulse signal from the counter 84 in the two times speed mode and selectively passes the third pulse signal from the AND circuit 85 in the four times speed mode. The output pulse signal of the switch 86 is supplied to an enable terminal of the write address counter 87 to control the counting operation thereof. In the two times speed mode, the counter 87 is controlled by the first pulse signal so as to count every other pulses of the second clock signal from the terminal 83, and the counted output signal of the counter 87 has a repetition frequency Fs2/2. On the other hand, in the four times speed mode, the counted output signal of the counter 87 has a repetition frequency Fs2/4.

Figure 6:
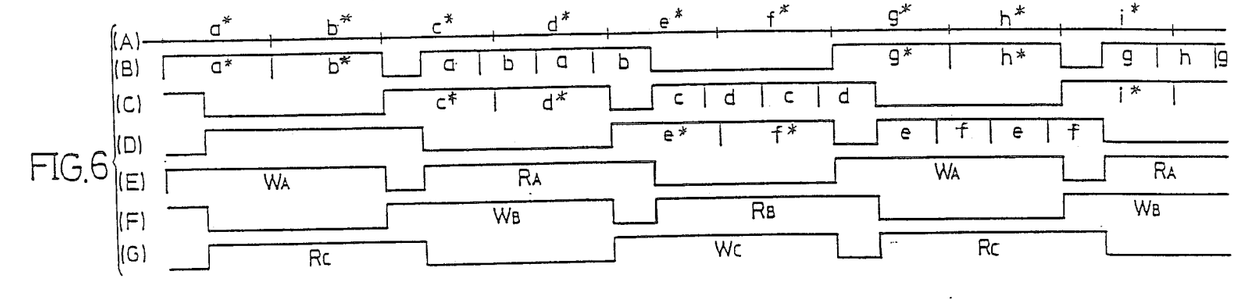
FIG. 6 shows signal waveforms for explaining the operation of the block system shown in FIG. 1 when the source of the composite video signal is a video signal related to a movie film having 30 picture frames per second.

The counted output signal of the write address counter 87 is supplied to a multiplexer 88 as a write-in address signal. On the other hand, the signal obtained in the read address counter 90 by counting the second clock signal is supplied to the multiplexer 88 as a read-out address signal. The multiplexer 88 is supplied with the write-in/read-out address signals generated within the address signal generating part 24 via a terminal 89. The multiplexer 88 selectively passes the output address signal of the write address counter 87 during a write-in time period, and selectively passes the output address signal of the read address counter 90 during a read-out time period. A chip select decoder 91 decodes upper two bits of the output address signal of the multiplexer 88, and generates chip select signals CSA, CSB and CSC time-divisionally having high levels. The chip select signals CSA, CSB and CSC are supplied to the switches 63, 64 and 65 shown in FIG. 3. The output address signal of the multiplexer 88 is supplied to the switches 60, 61 and 62 shown in FIG. 3. In the two times speed mode, the chip select signal CSA becomes as shown in FIG. 6(E), and the chip select signals CSB and CSC become as shown in FIGS. 6(F) and 6(G), respectively. In the four times speed mode, the chip select signals CSA, CSB and CSC respectively become as shown in FIGS. 7(E), 7(F) and 7(G).

Hence, in the two times speed mode, out of the first digital audio data which are obtained from the A/D converter 25 and are related to the audio signal having the time base thereof expanded by two as shown schematically in FIG. 6(A), the data a* and b* are written into the memory block 66 during the time period $W_A$ of eight fields in which the chip select signal CSA has the high level as shown in FIG. 6(E), the data c* and d* are written into the memory block 67 during the next time period $W_B$ of eight fields in which the chip select signal CSB has the high level as shown in FIG. 6(F), and the data e* and f* are written into the memory block 68 during the next time period $W_C$ of eight fields in which the chip select signal CSC has the high level as shown in FIG. 6(G). Thus, the memory blocks 66 through 68 successively and periodically perform the write-in operation for every eight fields. During the time periods $R_A$ through $R_C$ of eight fields shown in FIGS. 6(E) through 6(G) which are 1.5 fields after the respective write-in operations of the memory blocks 66 through 68, the chip select signals CSA through CSC have high levels, and the memory blocks 66 through 68 perform read-out operations so as to produce second digital audio data having the time base thereof compressed by ½.

The data written into the memory blocks 66 through 68 in eight fields are read out by compressing the time base by ½, and thus, the input data of eight fields are all read out in four fields. However, since the read-out time period is eight fields and not four fields, the input data of eight fields are read out twice from the memory blocks 66 through 68. FIG. 6(B) schematically shows the write-in data and the read-out data of the memory block 66, and FIGS. 6(C) and 6(D) schematically show the write-in data and the read-out data of the memory blocks 67 and 68, respectively. The sequence of the read-out data is identical to the recording sequence on the disc shown in FIG. 8(D).

Figure 7:
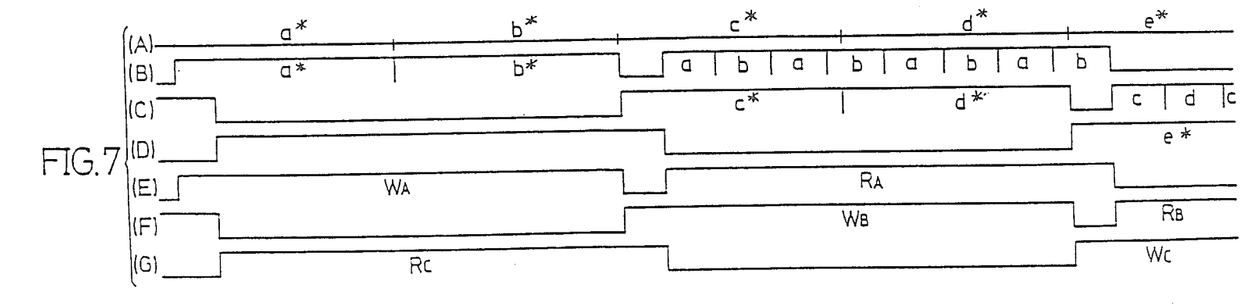
FIG. 7 shows signal waveforms for explaining the operation of the block system shown in FIG. 1 when the source of the composite video signal is a VTR for playing a pre-recorded magnetic tape or a television camera and generates a video signal having 30 frames per second.

On the other hand, in the four times speed mode, first digital audio data shown schematically in FIG. 7(A) and having the time base thereof expanded by four are supplied to the memory blocks 66 through 68. In the four times speed mode, the memory blocks 66, 67 and 68 successively perform the write-in operation in the respective time periods $W_A$, $W_B$ and $W_C$ of 16 fields in which the chip select signals CSA, CSB and CSC have high levels as shown in FIGS. 7(E), 7(F) and 7(G). During the time periods $R_A$ through $R_C$ of 16 fields shown in FIGS. 7(E) through 7(G) which are 1.5 fields after the respective write-in operations of the memory blocks 66 through 68, the chip select signals CSA through CSC have high levels, and the memory blocks 66 through 68 perform read-out operations. Since the address signal frequency Fs2 at the time of the read-out operation is four times the address signal frequency Fs1 at the time of the write-in operation, the first digital audio data having the time base thereof expanded by four and indicated with the asterisk are time base compressed by ¼ so as to produce second digital audio data indicated without the asterisk. As shown schematically in FIGS. 7(B), 7(C) and 7(D), the second digital audio data are successively produced from the memory blocks 66, 67 and 68, and the data are read out four times. The read-out sequence is identical to the recording sequence on the disc shown in FIG. 10(D).

Hence, in the manner described heretofore, it is possible to repeatedly generate the audio signal in a desired sequence.

As another method of normally reproducing the composite video signal having as its source the movie film having 24 picture frames per second as a video signal having a field frequency of 60 Hz without a time base deviation, it is possible to carry out the reproduction based on a 2-2-4-2-2-4-2-2 pull-down system. In this case, the same picture frame of the composite video signal having as its source the movie film having 24 picture frames per second is also recorded repeatedly in one track turn. However, in this case, a scanning locus of the reproducing element is different from that shown in FIG. 12, and it is necessary to change the recording sequence shown in FIGS. 5A(B) through 5A(D) and 5B(B) through 5B(D) in accordance with the pull-down system.

In the case of the 2-2-4-2-2-4-2-2 pull-down system, the composite video signal corresponding to eight picture frames of the movie film is reproduced in 20 fields. As a result, the motion in a picture reproduced in the normal reproduction mode is not as smooth as that obtainable in the 2-3 pull-down system, but there are no problems from the practical point of view.

The number of digital memories (memory blocks) is not limited to three, and it is possible to use two digital memories, for example. In addition, the digital memories are used as the means for performing the time base compression, but it is possible to use analog memories (for example, charge coupled devices) to perform the time base compression.

Industrial Applicability

As described heretofore, the audio signal generating apparatus according to the present invention is especially suited for generating an audio signal which is to be recorded on a video disc so that it is possible to normally reproduce the audio signal in a normal reproduction mode, where the video disc is repeatedly recorded with the same field or same picture frame (same unit) of a composite video signal in the same track turn and a picture is reproduced in the normal reproduction mode by causing a forced track shift of a pickup reproducing element one or more times in two revolutions of the video disc.

What is claimed is:

1. An audio signal generating apparatus for generating an audio signal which is to be recorded on a video disc so that the audio signal is normally reproduceable in a normal reproduction mode, said video disc being recorded with a first composite video signal or a second composite video signal so that the first video signal related to the same field or the second composite video signal related to the same picture frame of a movie film is repeatedly recorded for a plurality of fields in each track turn, a picture being obtained from the video disc in the normal reproduction mode as a pickup reproducing element scans along a scanning locus including a forced track shift, said audio signal generating apparatus comprising:

time base compressed audio signal generating means for generating a time base expanded audio signal which is expanded of the time base by M by reproducing a pre-recorded audio signal from a first recording medium at a speed which is slower than a speed at the time of recording the first recording medium, where M is a rational number greater than one, said first recording medium being pre-recorded with an audio signal separated from a television signal;

clock signal generating means for generating clock signals in phase synchronism with a periodic signal in the first or second composite video signal;

time base compressing means for time base compressing said time base expanded audio signal by 1/M based on said clock signals and for producing a time base compressed audio signal which has portions of information repeated and is continuous on the time base; and recording means for recording said time base compressed audio signal from said time base compressing means on a second recording medium together with the first or second composite video signal related to the same field or the same picture frame for every said plurality of fields.

2. An audio signal generating apparatus as claimed in claim 1 in which said time base compressing means comprises an analog-to-digital converter for converting said time base compressed audio signal into first digital audio data, an address signal generating part for producing a write-in address signal based on a first clock signal which is obtained from said clock signal generating means and has a repetition frequency Fs1, and for producing a read-out address signal based on a second clock signal which is obtained from said clock signal generating means and has a repetition frequency Fs2 which is M times the repetition frequency Fs1, a plurality of digital memories responsive to the address signals from said address signal generating part for time-divisionally writing therein said first digital audio data and for thereafter time-divisionally reading out therefrom second digital audio data having the time base thereof compressed to 1/M, and a digital-to-analog converter for converting said second digital audio data into an analog signal and for producing the analog signal as said time base compressed audio signal.

3. An audio signal generating apparatus as claimed in claim 1 in which a reproducing speed of said time base expanded audio signal and frequencies of the clock signals generated from said clock signal generating means are switched over depending on whether the composite video signal which is recorded on the video disc together with the audio signal is the first or second composite video signal.

4. An audio signal generating apparatus as claimed in claim 1 in which said time base expanded audio signal generating means generates an audio signal having the time base thereof expanded by N, where N is a natural number greater than or equal to two, and said time base compressing means compresses by 1/N the time base of said time base expanded audio signal received for every time period equal to a reproducing time period of N track turns and repeatedly produces the time base compressed audio signal N times.

5. An audio signal generating apparatus as claimed in claim 1 in which said time base expanded audio signal generating means expands by 8/5 the time base of an audio signal which is to be reproduced together with a composite video signal having as its source a movie film having 24 picture frames per second, said said time base compressing means compresses by $\frac{5}{8}$ the time base of said time base expanded audio signal received for every time period equal to a reproducing time period of 2.5 track turns and produces the time base compressed audio signal with portions thereof repeated.

* * * * *